United States Patent
Homan

(10) Patent No.: US 9,442,214 B2
(45) Date of Patent: Sep. 13, 2016

(54) SYSTEM AND METHOD FOR GRAVITY MEASUREMENT IN A SUBTERRANEAN ENVIRONMENT

(75) Inventor: Dean Homan, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 1218 days.

(21) Appl. No.: 12/340,278

(22) Filed: Dec. 19, 2008

(65) Prior Publication Data
US 2010/0161226 A1    Jun. 24, 2010

(51) Int. Cl.
*G01V 7/00*   (2006.01)

(52) U.S. Cl.
CPC ..................... *G01V 7/00* (2013.01)

(58) Field of Classification Search
CPC .................. G01V 7/00; G01V 5/12
USPC ............ 702/2, 6, 8, 33, 40, 141, 142;
73/514.27, 152.14, 152.46,
73/152.48–152.49, 152.54; 356/482;
166/247, 250.01; 250/253–269.8;
324/332, 333, 344; 340/856.3
See application file for complete search history.

(56) References Cited

U.S. PATENT DOCUMENTS

| | | | |
|---|---|---|---|
| 3,146,624 A | | 9/1964 | Talbot |
| 3,335,613 A | | 8/1967 | Goodman |
| 4,363,965 A | * | 12/1982 | Soberman et al. ........... 250/302 |
| 5,892,151 A | * | 4/1999 | Niebauer et al. ........... 73/382 R |
| 5,970,787 A | | 10/1999 | Wignall |
| 6,671,057 B2 | * | 12/2003 | Orban .......................... 356/496 |
| 6,738,720 B2 | * | 5/2004 | Odom et al. .................... 702/78 |
| 7,793,543 B2 | * | 9/2010 | Csutak ....................... 73/514.27 |
| 2006/0093087 A1 | * | 5/2006 | Procter .......................... 378/57 |
| 2006/0164648 A1 | * | 7/2006 | Howard ....................... 356/450 |

OTHER PUBLICATIONS

Prokopov A. et al., "Relativistic Effects in Global Satellite Navigation Systems," Acta Astronautica, Pergamon Press, Elmsford GB, vol. 64, No. 1, pp. 67-74 (Aug. 19, 2008).

* cited by examiner

*Primary Examiner* — Sujoy Kundu
*Assistant Examiner* — Ricky Ngon
(74) *Attorney, Agent, or Firm* — Michael Dae

(57) ABSTRACT

A technique facilitates the collection of improved gravitational acceleration measurements and enables use of those measurements in analyzing environmental characteristics of a subterranean region. In one embodiment, a downhole tool is constructed with a gravimeter having a quantum source and an associated detector. The quantum source and detector use a velocity of the quantum source for determining gravitational acceleration measurements that can be employed in evaluating subterranean characteristics.

26 Claims, 5 Drawing Sheets

SYSTEM AND METHOD FOR GRAVITY MEASUREMENT IN A SUBTERRANEAN ENVIRONMENT

BACKGROUND

Obtaining an understanding of subterranean characteristics can be important for oil exploration and other activities that benefit from an enhanced knowledge of the subterranean environment. Various sensors and techniques are used to obtain information related to rock formations, fluid reservoirs, and other features of the subject environment. In some applications, wellbores or other boreholes are drilled and sensors are lowered downhole to help obtain information on surrounding formations.

Various techniques have been employed to obtain gravity measurements that are useful in understanding the features and characteristics of the subterranean region. For example, gravity measurements can be used to determine the densities of the rock and other features surrounding a wellbore. The density data is useful in oil and gas exploration, for example, by helping determine oil and gas distribution throughout a given reservoir region.

As reported by R. L. Mossbauer in Zeit. F. physic 151, 124-143 (1958), it is possible to detect a Doppler shift (or velocity shift) in the frequency of low energy gamma rays emitted by a radioactive isotope using a gamma ray absorbing isotope exhibiting resonance absorption within the range of the shifted frequency. By minimizing the recoil energies of the emitting and absorbing nuclei, such resonance may exhibit a very narrow line width, for example, one part in $10^{12}$, thereby obtaining high sensitivity to a correspondingly slight Doppler shift. By way of example, radioactive cobalt-57, having a convenient half-life of 270 days, decays into excited nuclei of iron-57, which in turn emits 120 and 14.4 keV gamma rays in cascade. The emission of the 14.4 keV gamma ray has a half-life of $10^{-7}$ seconds. Specially prepared foils enriched with iron-57 isotope have an absorber in close proximity to the cobalt-57 source, and therefore a narrow and very substantial resonance absorption may be observed. There are many types of metals that can be used to observe this so called Mossbauer effect. Here we will use the iron-57 isotope by way of example only.

In a typical demonstration of the Mossbauer effect, either the source or the absorber remains stationary, and the other is moved, for example, by an audio loud-speaker cone, a rotating platform, or a constant velocity drive. To obtain a measure of the absorption characterizing the effect, a scintillation counter is typically used on the face of the absorber film opposite the source so as to be responsive to the gamma rays passing from the source to the absorber film.

SUMMARY

In general, the present invention provides a methodology and system that enable the collection of improved gravity measurements and the use of those measurements in analyzing a given subterranean environment. In one embodiment, a downhole tool is constructed in cooperation with a gimbaled support structure. Additionally, a quantum source and an associated detector are located in the gimbaled support structure such that the support structure maintains an axis of the quantum source and the detector parallel to gravitational force. The quantum source and detector are able to utilize a velocity of the quantum source in determining gravity measurements used in evaluating characteristics of the subterranean environment.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

Figure 1:
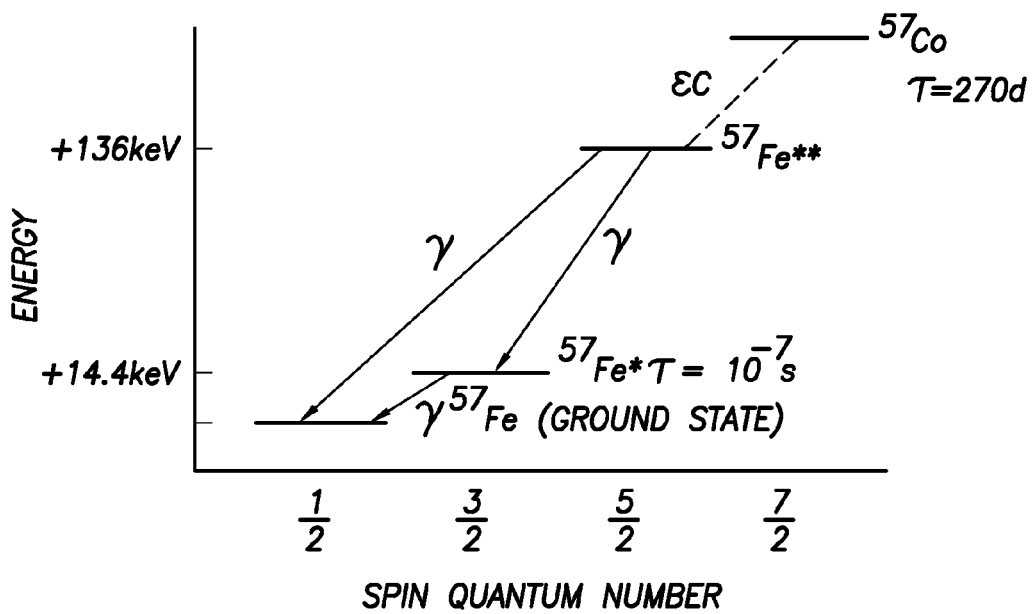
FIG. 1 is a graphical representation of energy levels for a particular nucleus, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible. For example, with respect to the Mossbauer effect, there are many candidate isotopes that may be used to observe the energy broadening of the absorption peak due to a change in the velocity of the source in the presence of gravitational acceleration, though the discussion below centers on an isotope of iron.

The present invention generally relates to a methodology and system for determining and evaluating characteristics of a subterranean environment, but the methodology and system would function on the surface or ocean floor as well. According to one embodiment, a compact, downhole multi-component gravimeter is provided for use in evaluating a variety of characteristics related to an underground formation or other subterranean region. For example, the multi-component gravimeter can be used to measure deep density and waterfronts. A test mass having a gravitational potential composed of a quantum mechanical object is accelerated, and a detector measures the velocity spectrum or the energy spectrum. The velocity is related to gravity through energy conservation relations, and the gravity can be used in evaluating/determining subterranean characteristics, such as subsurface-hydrocarbon reservoir or ore body density.

In one embodiment of the present invention, a radioactive source in the presence of a gravitational acceleration is dropped or oscillated. Therefore, a Doppler widening of the natural spectral line will be observed in the absorption plot versus energy or velocity. One can measure the width of the absorption peak and deduce the gravitational acceleration. This measurement can be repeated at different positions in the earth to obtain differential gravity accelerations to then deduce the density between the different measured positions.

According to one embodiment, the methodology for measuring gravity and/or acceleration can be accomplished in a downhole tool regardless of the orientation of the downhole tool. The methodology involves the use of quantum objects, such as nuclei, atoms, ions and molecules that are controllably moved to an excited energy level by various available techniques. An example of a quantum source capable of the energy resolution needed would be a Mössbauer spectroscopy of say $^{57}$Fe, $^{119}$Sn, or $^{181}$Ta nuclei and some others. (See MOSSBAUER, R. L., 1958, 2. *Phys.*, 151, 124; *Naturwissenschaften*, 45, 538; 2. *Naturf.*, 14a, 211; 1961, *Proceedings of the Second Mossbauer Conference, Paris* (New York: JohnWiley)).

The observation of the gravitational Doppler-Mossbauer effect is essentially very simple, comprising a free-falling source of radiation, an absorber containing the isotope, a radiation detector, and a system for providing relative motion between the source and absorber that sweeps the natural line width and the final Doppler shifted energy of the falling source.

Subsequently, the excited energy state relaxes to a lower energy quantum state, and a photon of energy $E_0=h\nu$ is emitted, where h is Plank's constant and $\nu$ is the photon frequency. If the quantum object is moving with final velocity $v_f$ much less than the speed of light c, then the energy of the photon is Doppler shifted such that $$E_{total} = E_\lambda \left(1 + \frac{v_f}{c}\right),$$

if the photon is directed along the motion of the quantum system ($E_\lambda$ is defined below). If the shift in energy $$\frac{\Delta E_{Dop}}{E_\lambda} \geq \frac{\Gamma}{E_\lambda},$$

then the shift is observable, where $\Gamma$ is the emitted energy line width and is defined as $$\Gamma = \frac{\eta}{\tau},$$

and $\tau$ is the lifetime of the excited state. For the gravity sensitivity desired, the Mössbauer effect observed in certain metallic isotopes has the necessary energy line widths and count rates. In such embodiments, these energy relationships are utilized by positioning a quantum source and a detector in a downhole tool. The quantum source and the detector can be mounted to a gimbaled support which maintains the axis extending between the quantum source and the detector parallel to the gravitational force regardless of the orientation of the downhole tool.

In operation, the downhole tool and the gravimeter/gravity sensor can be used to measure absolute or differential gravitational acceleration in a subterranean, e.g. downhole, environment with sensitivity on the order of ≈1 μg. According to one embodiment of the downhole tool, one or two evacuated and temperature/pressure controlled gimbaled chambers are provided to contain the quantum source, which can be assumed to be a Mössbauer source, and the detector separated by a short distance, e.g. a few centimeters. The gravimeter is used to take absolute gravitational acceleration measurements at different downhole locations, as specified by an operator. The absolute gravitational acceleration measurements at two separate locations enable determination of the differential gravitational acceleration measurement.

An example of a particular Mössbauer spectrum for a particular nucleus $^{57}$Fe is illustrated graphically in FIG. 1 and shows a transition from an excited spin state 3/2 to the ground state 1/2 with a transition energy of 14.4 keV and a mean lifetime of $1.4 \times 10^{-7}$. The calculated line width is $1.0 \times 10^{-8}$ eV and the resolution for this transition in energy is $$\frac{\Gamma}{E_\lambda} = 7.0 \times 10^{-13}.$$

This is a Mössbauer effect observed for a particular stationary source example. The probability of emission, f, under room temperature has a comparably high value only for a restricted number of isotopes ($^{57}$Fe, $^{119}$Sn, or $^{181}$Ta and some others) and depends on the temperature of crystal.

In this example, the velocity of the free falling quantum source at each downhole location can be determined by measuring the absorption spectra of a quantum system that is scanned in energy or velocity by way of a constant velocity drive moving over the Doppler shifted source velocity range. For a source dropped a known distance, h, the velocity shift is $\Delta v = v_f - v_0 = \sqrt{2gh}$. By way of example, the velocity of a quantum source falling 1 cm is $v_f = 445$ mm/s. It should be noted that the quantum source and the detector also can be mounted on a spring, torsion balance, pendulum, or other suitable mechanism to measure the transverse component of gravity, where the minimum and maximum velocity during the periodic motion is related to the square root of gravity for small displacements. In this case, the system is fixed to the tool mechanically rather than in a gimbaled structure. The detector directly measures the intensity $I(E) = \langle \Phi_i | \Phi_f \rangle$ versus energy (or velocity $I(v)$) of the system to within a resolution of $$\frac{2\Gamma}{E_\lambda},$$

where the factor of 2 is used due to the fact that both the source and the detector have natural absorption line widths that add. Accordingly, an electrical signal is directly related to a precise velocity measurement in x, y, and z directions due to gravitational force or any acceleration if the sensor is not fixed to the earth.

Figure 2:
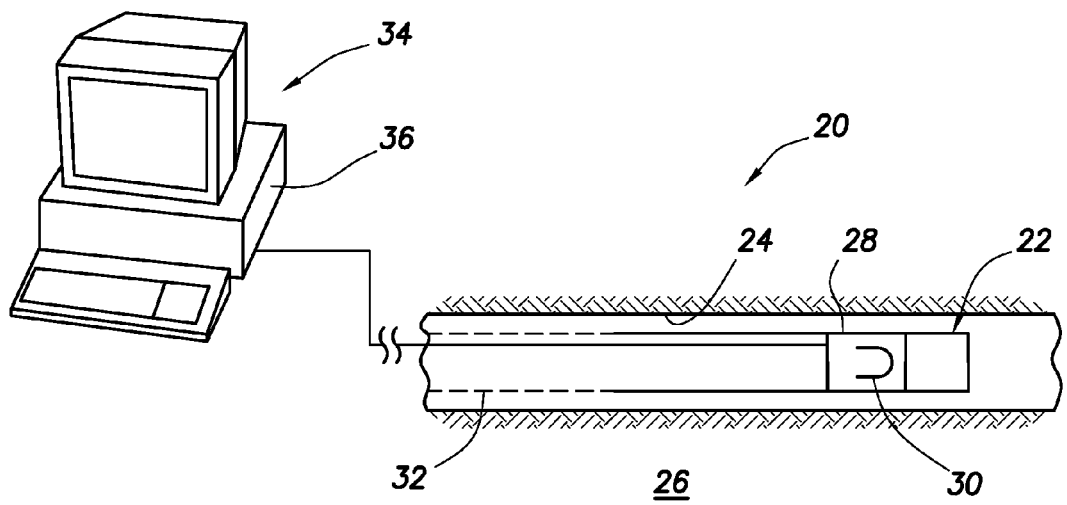
FIG. 2 is a schematic illustration of a well tool with a gravimeter positioned in a borehole, according to an embodiment of the present invention.

Referring generally to FIG. 2, a well system 20 for determining subterranean characteristics is illustrated according to one embodiment of the present invention. Well system 20 is illustrated schematically and may comprise a variety of configurations and components. Additionally, the well system can be utilized in determining gravity measurements in vertical wells and deviated wells because the measurements can be made regardless of the orientation of the downhole tool.

In the embodiment illustrated, well system 20 comprises a downhole tool 22 that may be deployed downhole in a wellbore 24 which is formed in a surrounding formation 26. The downhole tool 22 comprises a gravity sensor/gravimeter 28 cooperating with a gimbaled support structure 30 that enables operation of the gravimeter 28 to determine gravity measurements regardless of the orientation of downhole tool 22. The downhole tool 22 is deployed through wellbore 24 by a suitable conveyance 32, such as a wireline. However, other types of conveyances also can be utilized, including less flexible conveyances such as coiled tubing, LWD, or MWD. The downhole tool 22 and gravimeter 28 also are connected to a processing system 34 having a processor 36 for processing data obtained by downhole tool 22. By way of example, processing system 34 may comprise a computer-based system located at one or more surface locations. Alternatively, some or all of the data processing can be accomplished downhole by locating a suitable processor in downhole tool 22.

Figure 3:
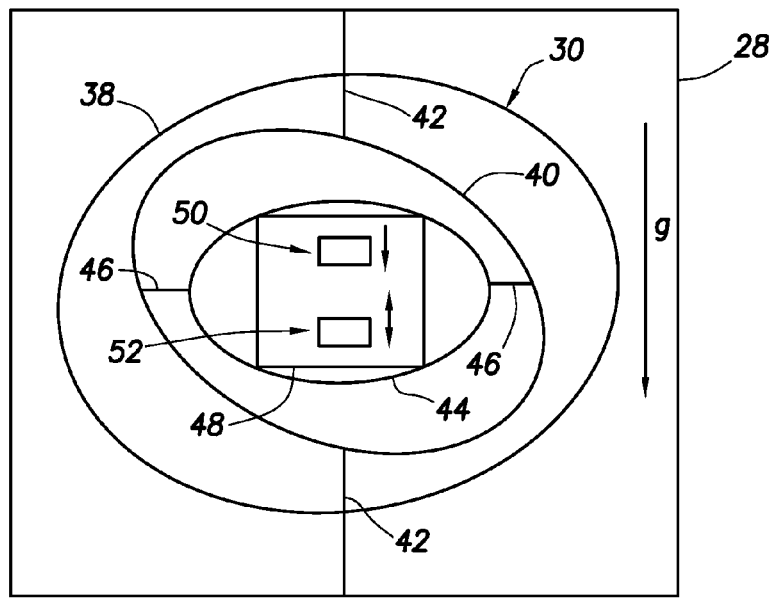
FIG. 3 is a schematic illustration of one example of the gravimeter illustrated in FIG. 1, according to an embodiment of the present invention.

Referring generally to FIG. 3, one example of gravimeter 28 is illustrated schematically. In this example, gimbaled support structure 30 comprises an outer support structure 38 within which an outer gimbal 40 is rotatably mounted via pivot joints 42. An inner gimbal 44 is rotatably mounted within outer gimbal 40 via pivot joints 46. Within inner gimbal 44, at least one temperature and pressure controlled gimbaled chamber 48 is mounted for containing a quantum source 50 and a detector 52. The quantum source 50 is able to radiate photons when transitioned between two energy levels, as described above. The detector 52 is designed to receive the photons and may comprise, for example, an absorption detector or a backscattering detector.

Figure 4:
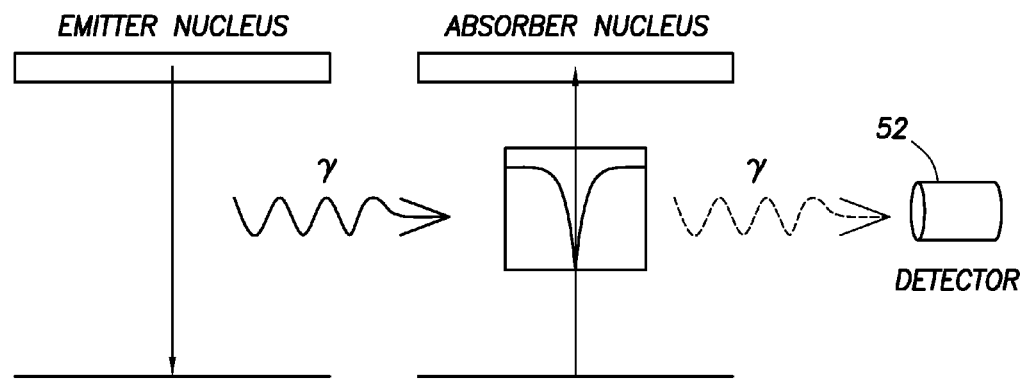
FIG. 4 is an energy level diagram illustrating operation of a quantum source and associated detector, according to an embodiment of the present invention.
Figure 5:
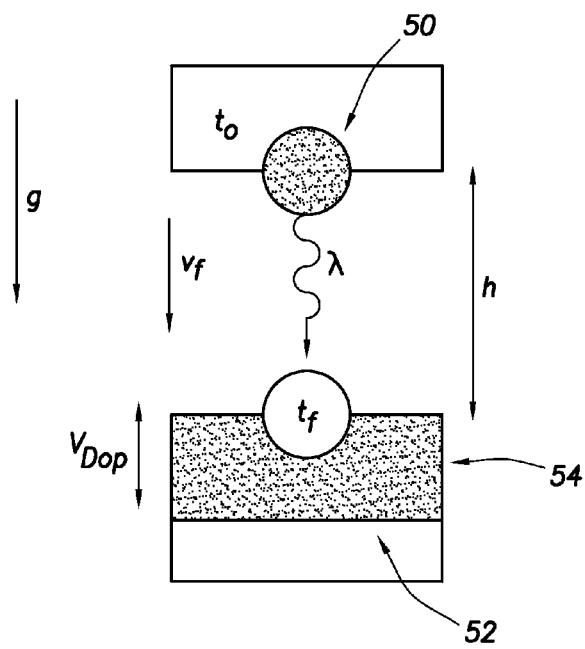
FIG. 5 is an illustration of a free falling quantum source that can be used in the gravimeter to determine gravity measurements, according to an embodiment of the present invention.

The energy levels of the emitter and absorber quantum system are illustrated schematically in FIG. 4. FIG. 4 provides a simple energy level diagram illustrating a source and absorber with the detector 52. To observe the natural line width of the energy level, either the source or the absorber must be swept in energy (or conversely velocity) which Doppler shifts the frequency or energy of the emitted photon of a wavelength λ. A schematic illustration of the gravimeter is illustrated in FIG. 5 and shows quantum source 50, an absorber 54, and the detector/actuator 52. In this example, a free falling source/emitter falls a distance h and has a final velocity $v_f$ which can be assumed parallel to gravitational force because the quantum source 50 and detector 52 are mounted in gimbaled support structure 30 of downhole tool 22.

In this example, the repeatedly dropped quantum source/emitter and constant velocity $v_{Dop}$ driven absorber are a fixed distance h apart and their axis is parallel to the gravitational acceleration g. Emitted photons propagating in the direction of gravity are Doppler shifted due to the acceleration experienced by the source mass, and those photons are allowed to be absorbed by the detector 52. The final velocity of the quantum source is $v_f = \sqrt{2gh}$, using energy conservation. The energy of the system at $t_0$ before the source is dropped can be given as:

$$E_0 = E_\lambda + E_{sys},$$

where $E_\lambda = hc/\lambda$ is the photon energy and $E_{sys}$ comprises other smaller systematic shifts in the photon energy due to electromagnetic fields in the environment, source and absorber. Shifts also occur due to variation in temperatures between the source 50 and the absorber 54. Other shifts occur due to electron conversion, Compton and photon scattering, and other factors. Generally, these effects are well known for each particular quantum object. The energy of the system at $t_f$ when the source has maximum velocity is given as:

$$E_f = E_\lambda + E_D + E_{GR} + E_{sys},$$

where $$E_D = \frac{v_f}{c} E_\lambda = \frac{\sqrt{2gh}}{c} E_\lambda$$

is the Doppler shifted photon at its final velocity $v_f$, $$E_{GR} = \frac{gh}{c^2} E_0$$

is the gravitational red shift due to the potential energy shift in the photon, and $E_{sys}$ comprises other smaller systematic shifts in the photon energy that are the same as those of the initial source position. The gravitational red shift is small compared to the Doppler shift. Another small energy shift may result from the thermal red shift or second-order Doppler effect. The effect is due to lattice vibration or temperature differences between the source and emitter and can be described as follows:

$$E_{2^{nd} Dop} = \frac{v(T)^2}{2c^2} E_\lambda \approx \frac{3 K_B \Delta T}{2 m_{Fe57} c^2}.$$

Figure 6:
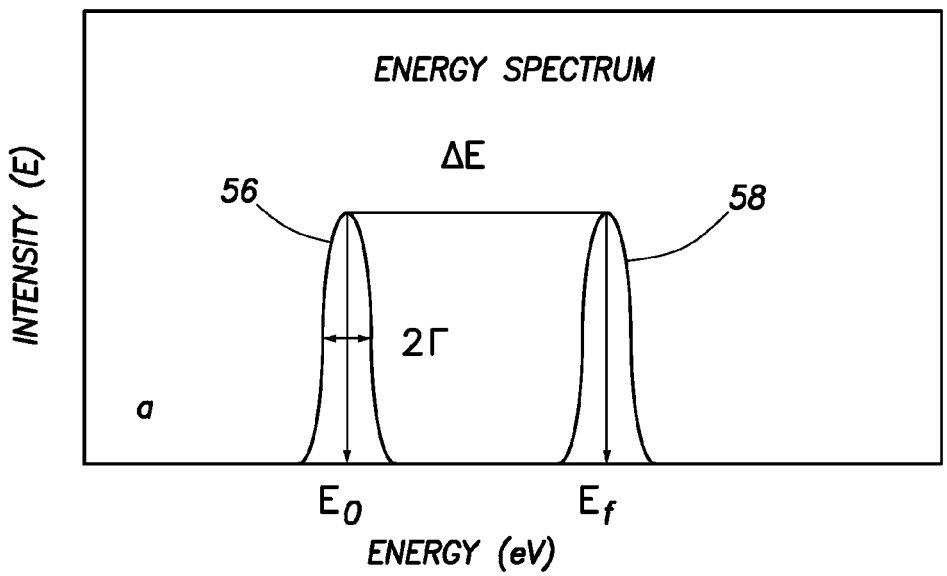
FIG. 6 is a diagram of an energy spectrum of a free falling source, according to an embodiment of the present invention.

One example of a measured energy spectrum is illustrated in FIG. 6. In this example, the spectrum is a Lorentzian shaped curve spread over the energy ΔE with a plateau between an initial Lorentzian curve 56 and a final Lorentzian curve 58. The change in energy between the two extremes, which are fit to a Lorentzian curve, is given by the formula:

$$\Delta E = E_f - E_0 = E_D + E_{GR} \approx \frac{\sqrt{2gh}}{c} E_\lambda.$$

Figure 7:
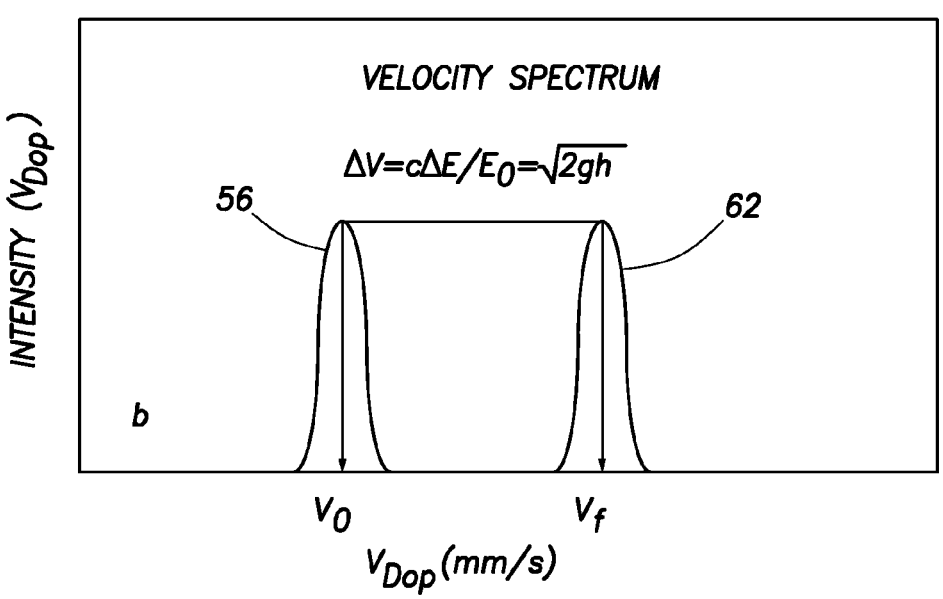
FIG. 7 is a diagram similar to that of FIG. 6 but showing a velocity spectrum, according to an embodiment of the present invention.

For most quantum systems, the gravitational red shift $E_{GR}$ is extremely small for small drops, h, and can be ignored. Conversely, the energy equations can be written in velocity space, and the same spectrum can be plotted because the spectrum is observed by Doppler shifting the detector so as to absorb the photon. A velocity spectrum is illustrated in FIG. 7, where the velocity shift is simply $\Delta v = \sqrt{2gh}$. By way of example, the velocity of a quantum source falling 1 cm is $v_f = 445$ mm/s. Very accurate constant velocity drives are available for just such a use. Subsequently, the data is fit and the two Lorentzian peaks 60, 62 are selected, as illustrated on the left and right sides of FIG. 6, respectively. One method for fitting the data comprises applying a least squares fit to the data to the left and right of the two peaks. Effectively, FIG. 6 illustrates an energy spectrum of a free falling source with the detector cycling with a constant velocity over the velocity range of interest, and FIG. 7 illustrates a velocity spectrum of a free falling emitter.

Once the absolute gravitational acceleration $g_{1z}$ is measured at a point in space $z_1$, the downhole tool 22 and gravimeter 28 can be moved with appropriate accuracy to a new position $z_2$ for measurement of absolute gravitational acceleration $g_{2z}$ at the second position. Based on the two measurements of absolute gravitational acceleration, a differential gravitational acceleration measurement $$\frac{\Delta g_z}{\Delta z}$$

can be determined, e.g. calculated on processing system 34. The differential gravitational acceleration measurement essentially removes the volume of earth above $z_1$ and below $z_2$ from the mathematical inversion and/or other analysis to provide a much better downhole measurement for use in obtaining data on the subterranean structure.

Well system 20 can be utilized in obtaining a variety of related measurements. For example, a pendulum, a torsion pendulum, or another periodic motion technique can be employed in the transverse direction to the vertical gravity component and the transverse maximum velocity can be related to transverse gravity. With respect to a pendulum, the maximum velocity for small or first order mass displacements is $v_{pend} = \sqrt{rg}$ and the change in energy in the spectrum is then $$\Delta E_{pend} = \sqrt{\frac{rg}{c^2}} E_\lambda.$$

The spectrum is similar to that illustrated in FIG. 6. In other applications, the velocity and energy relationships for a torsion pendulum, or for other harmonic motion in the transverse direction, can be determined. Once $g_{1i}$ (i=x,y) is measured at a point in space $z_1$, the gravity sensor/gravimeter is moved to a new position $z_2$ with appropriate accuracy. At the second position, a second absolute gravitational acceleration measurement $g_{2i}$ is obtained. Based on the two measurements, a differential gravitational acceleration measurement $$\frac{\Delta g_i}{\Delta z}$$

can be determined. The differential gravitational acceleration measurement essentially removes the volume of earth above $z_1$ and below $z_2$ from the mathematical inversion and/or other analysis to provide a much better downhole measurement for use in obtaining data on the subterranean structure. For example, the measurement is particularly sensitive to horizontal water or gas floods.

The well system 20 also can be used to obtain deep density measurements with respect to the subterranean formation. The relationship of density to differential gravitational acceleration is provided by the formula:

$$\rho = 3.701 - 12\left(\frac{\Delta g_z \cos\theta_{tilt}}{\Delta z \cos\theta_{inc}}\right).$$

From the measurements taken by downhole tool 22 at separate locations of the downhole tool, via quantum source 50 and detector 52, the $\Delta g_z$ is determined and the density can be calculated on processing system 34. The differential gravitational acceleration can be obtained very accurately with the potential for only small systematic errors for which calibrations can be performed. For example, the data can be processed and adjusted based on an estimate of systematic errors with respect to the gimbals and $\Delta z$.

The downhole tool 22, including the gimbaled support structure 30 and the internally mounted gravity/acceleration sensors 50, 52, may be utilized in a wide variety of applications for obtaining data processed via processing system 34 to evaluate many characteristics of the subterranean environment. Although the potential applications are many, some of those applications may be carried out as outlined procedurally in the flowcharts of FIGS. 8 and 9.

Figure 8:
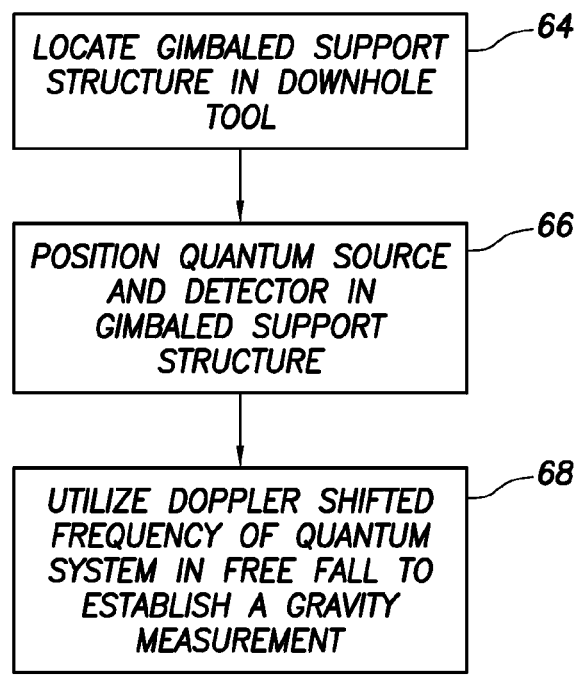
FIG. 8 is a flowchart illustrating one example of a methodology for obtaining useful gravity measurements, according to an embodiment of the present invention.

In one operational example illustrated in FIG. 8, the gimbaled support structure 30 is positioned at a desired location within downhole tool 22, as illustrated by block 64. The gimbaled support structure 30 is used to mount and position the quantum source 50 and detector 52 to operate as a gravity sensor 28, as illustrated by block 66. Once the downhole tool 22 and gravity sensor are moved downhole, the quantum source 50 and detector 52 enable use of the Doppler shifted frequency of a quantum system in free fall to establish a gravitational acceleration measurement, as illustrated by block 68. As described above, one or more gravitational acceleration measurements may be used to determine a variety of characteristics regarding the subterranean formation.

Figure 9:
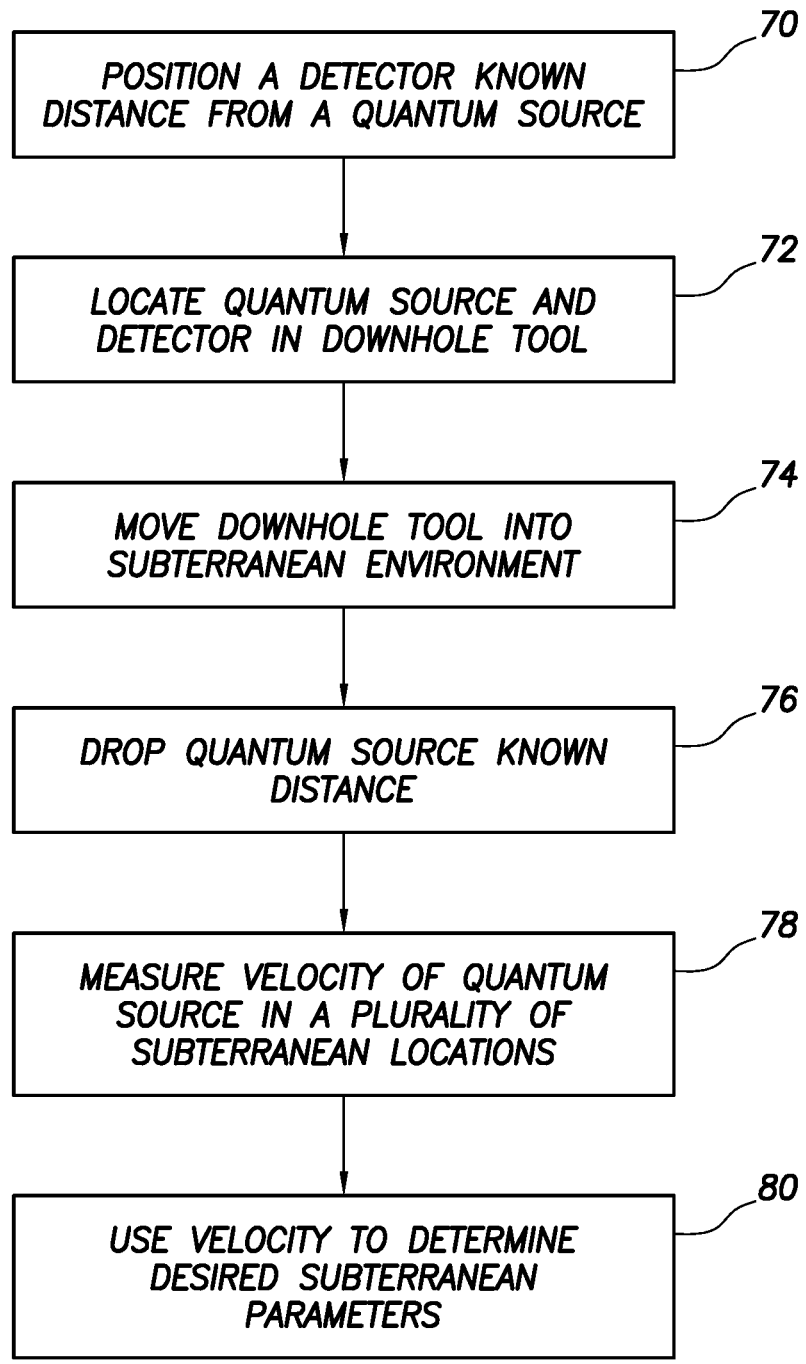
FIG. 9 is another flowchart illustrating one example of a methodology for determining various downhole parameters, according to an embodiment of the present invention.

Another operational example is illustrated by the flowchart of FIG. 9. In this embodiment, detector 52 is positioned at a known distance from quantum source 50, as illustrated by block 70. The quantum source 50 and the detector 52 are then located within downhole tool 22, as illustrated by block 72, to establish a gravity sensor. The downhole tool 22 and the gravity sensor are then moved down along a wellbore into a subterranean environment, as illustrated by block 74. At a desired downhole location, the quantum source is dropped a known distance to determine a velocity of the quantum source, as illustrated by block 76. The velocity measurement is performed at one or more subterranean locations, as illustrated by block 78, and the two or more velocity measurements are utilized in determining desired subterranean parameters, as illustrated by block 80. For example, the velocity measurements and the distance between the velocity measurements can be used to establish a differential gravitational acceleration measurement. In turn, the differential gravitational acceleration measurement may be processed by processing system 34 to evaluate a variety of subterranean characteristics, including deep density.

The system and methodology described herein may be employed for improving the evaluation of various subterranean characteristics. The ability to obtain accurate absolute gravitational acceleration and differential gravitational acceleration measurements facilitates the accumulation of data used in gas and oil exploration applications and in a variety of other applications that benefit from an enhanced knowledge of the subterranean environment. The gimbaled support structure enables use of the quantum source/detector gravity sensor at many different downhole tool inclinations. Accordingly, the methodology can be performed in many types of vertical and deviated wellbores. The types of quantum sources, absorbers, and detectors may vary and may be selected according to operational factors, environmental factors, availability factors, available equipment and other factors. Additionally, the downhole tool 22 may be constructed in a variety of forms and configurations for use alone or in cooperation with other types of tools.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A method to determine a gravitational acceleration using the Mossbauer effect, comprising:
   (a) providing a quantum source and a detector, wherein the quantum source comprises a radioactive isotope able to demonstrate Mossbauer effect and emits photons;
   (b) allowing one of the quantum source and the detector to fall in a gravitational field such that the quantum source and detector move relative to each other;
   (c) measuring Doppler shifted frequencies of the emitted photons;
   (d) determining a velocity of the falling quantum source or falling detector based on the Doppler shifted frequencies of the emitted photons; and
   (e) determining the gravitational acceleration based on the determined velocity.

2. The method as recited in claim 1, wherein steps (b) through (e) are performed at a plurality of stations, thereby determining an absolute gravitational acceleration at each of the stations.

3. The method as recited in claim 2, further comprising determining a differential gravitational acceleration based on any two of the absolute gravitational accelerations.

4. The method as recited in claim 3, further comprising determining a property of a geological formation using the determined differential gravitational acceleration.

5. The method as recited in claim 4, wherein the property is a density of the formation.

6. The method as recited in claim 1, further comprising determining a property of a geological formation using the determined gravitational acceleration.

7. The method as recited in claim 1, wherein measuring the Doppler shifted frequencies of the emitted photons comprises measuring at least one of an energy spectrum and a velocity spectrum.

8. The method as recited in claim 1, further comprising performing the steps while the quantum source and the detector are disposed in a wellbore.

9. The method of claim 1, wherein the radioactive isotope comprises at least one of $^{57}$Fe, $^{119}$Sn, or $^{181}$Ta.

10. A method to determine a transverse component of a gravitational acceleration using Mossbauer effect, comprising:
    (a) providing a quantum source and a detector, wherein the quantum source includes a radioactive isotope able to demonstrate Mossbauer effect and emits photons as a result of emission of gamma rays due to radioactive decay of the radioactive isotope;
    (b) allowing the quantum source and the detector to move in the transverse direction relative to one another in a gravitational field;
    (c) measuring Doppler shifted frequencies of the emitted photons;
    (d) determining a velocity of the moving quantum source or the moving detector based on the Doppler shifted frequencies of the emitted photons; and
    (e) determining the transverse gravitational acceleration based on the determined velocity.

11. The method as recited in claim 10, wherein steps (b) through (e) are performed at a plurality of stations, thereby determining an absolute transverse gravitational acceleration at each of the stations.

12. The method as recited in claim 11, further comprising determining a differential transverse gravitational acceleration based on any two of the absolute transverse gravitational accelerations.

13. The method as recited in claim 12, further comprising determining a property of a geological formation using the determined differential transverse gravitational acceleration.

14. The method as recited in claim 13, wherein the property is a density of the formation.

15. The method as recited in claim 10, further comprising determining a property of a geological formation using the determined transverse gravitational acceleration.

16. The method as recited in claim 10, wherein measuring the Doppler shifted frequencies of the emitted photons comprises measuring at least one of an energy spectrum and a velocity spectrum.

17. The method as recited in claim 10, further comprising performing the steps while the quantum source and the detector are disposed in a wellbore.

18. A system, comprising:
    a quantum source that includes a radioactive isotope able to demonstrate Mossbauer effect and which emits photons as a result of emission of gamma rays due to radioactive decay of the radioactive isotope;
    a detector, wherein the quantum source and the detector are able to fall in a gravitational field and are moveable relative to one another; and
    a processor operatively connected to the detector and programmed to measure Doppler shifted frequencies of the emitted photons and to determine a velocity of the falling quantum source or falling detector based on the Doppler shifted frequencies of the emitted photons and to determine a gravitational acceleration based on the determined velocity.

19. The system as recited in claim 18, wherein the detector and the quantum source are mounted in a gimbaled mechanism.

20. The system as recited in claim 19, wherein the gimbaled mechanism comprises an evacuated chamber.

21. The system of claim 20, wherein the evacuated chamber is temperature and/or pressure controlled.

22. The system of claim 18, wherein the system is operative in a wellbore.

23. A system, comprising:
    a quantum source that includes a radioactive isotope able to demonstrate Mossbauer effect and emits photons;
    a detector, wherein the quantum source and the detector are able to fall in a gravitational field and are transversely moveable relative to one another; and
    a processor operatively connected to the detector and programmed to measure Doppler shifted frequencies of the emitted photons and to determine a velocity of the falling quantum source or falling detector based on the Doppler shifted frequencies of the emitted photons and to determine a gravitational acceleration based on the determined velocity.

24. The system as recited in claim 23, wherein the detector and the quantum source are mounted in a gimbaled mechanism.

25. The system as recited in claim 24, wherein the gimbaled mechanism comprises an evacuated chamber.

26. The system of claim 25, wherein the evacuated chamber is temperature and/or pressure controlled.

\* \* \* \* \*